United States Patent [19]
Pedrazzi

[11] Patent Number: 5,788,370
[45] Date of Patent: Aug. 4, 1998

[54] MACHINE FOR MAKING CRUSHED-ICE DRINKS

[75] Inventor: William Pedrazzi, San Prospero, Italy

[73] Assignee: S.P.M. Catering S.r.l., Spilamberto, Italy

[21] Appl. No.: 842,693

[22] Filed: Apr. 15, 1997

[30] Foreign Application Priority Data

Apr. 18, 1996 [IT] Italy ................................ MO96U0010

[51] Int. Cl.$^6$ ................................ F28F 5/06; B01F 15/06
[52] U.S. Cl. ...................... 366/144; 366/318; 62/343; 62/346; 165/87
[58] Field of Search .......................... 366/144, 147, 366/148, 149, 279, 318; 62/343, 342, 340, 346; 165/87; 222/146.6

[56] References Cited

U.S. PATENT DOCUMENTS

| | | | |
|---|---|---|---|
| 1,158,592 | 11/1915 | Valerius | 165/87 |
| 2,302,169 | 11/1942 | Baker | 366/147 |
| 2,411,138 | 11/1946 | Roberts | 366/147 |
| 2,722,716 | 11/1955 | Henning | 165/87 |
| 3,402,567 | 9/1968 | Menzel | 62/343 |
| 3,548,926 | 12/1970 | Archer | 165/87 |
| 3,818,716 | 6/1974 | Carpigiani | 62/343 |
| 4,741,264 | 5/1988 | McPeak | 366/318 |
| 4,856,580 | 8/1989 | Ley | 165/87 |
| 5,332,308 | 7/1994 | Scheuring | 366/155.1 |
| 5,372,423 | 12/1994 | Torredeflot | 366/155.1 |

*Primary Examiner*—Tony G. Soohoo
*Attorney, Agent, or Firm*—Fenwick & West LLP

[57] ABSTRACT

A machine for making crushed-ice drinks comprising: a crushed-ice drink containment tank, which is provided at the front with a pouring tap adapted to control an outlet for the crushed-ice drink which is located proximate to the bottom of the tank; a hollow cylinder, which lies inside the tank and is cooled by a refrigeration unit; and a screw feeder, which is arranged concentrically outside the hollow cylinder and is connected to motor elements in order to activate, by rotating, the heat exchange between the crushed-ice drink and the outer surface of the cylinder, a mixing element being rotatably supported above the hollow cylinder, inside the tank, and being adapted to be rotated in order to maintain a uniform density of the crushed-ice drink.

7 Claims, 1 Drawing Sheet

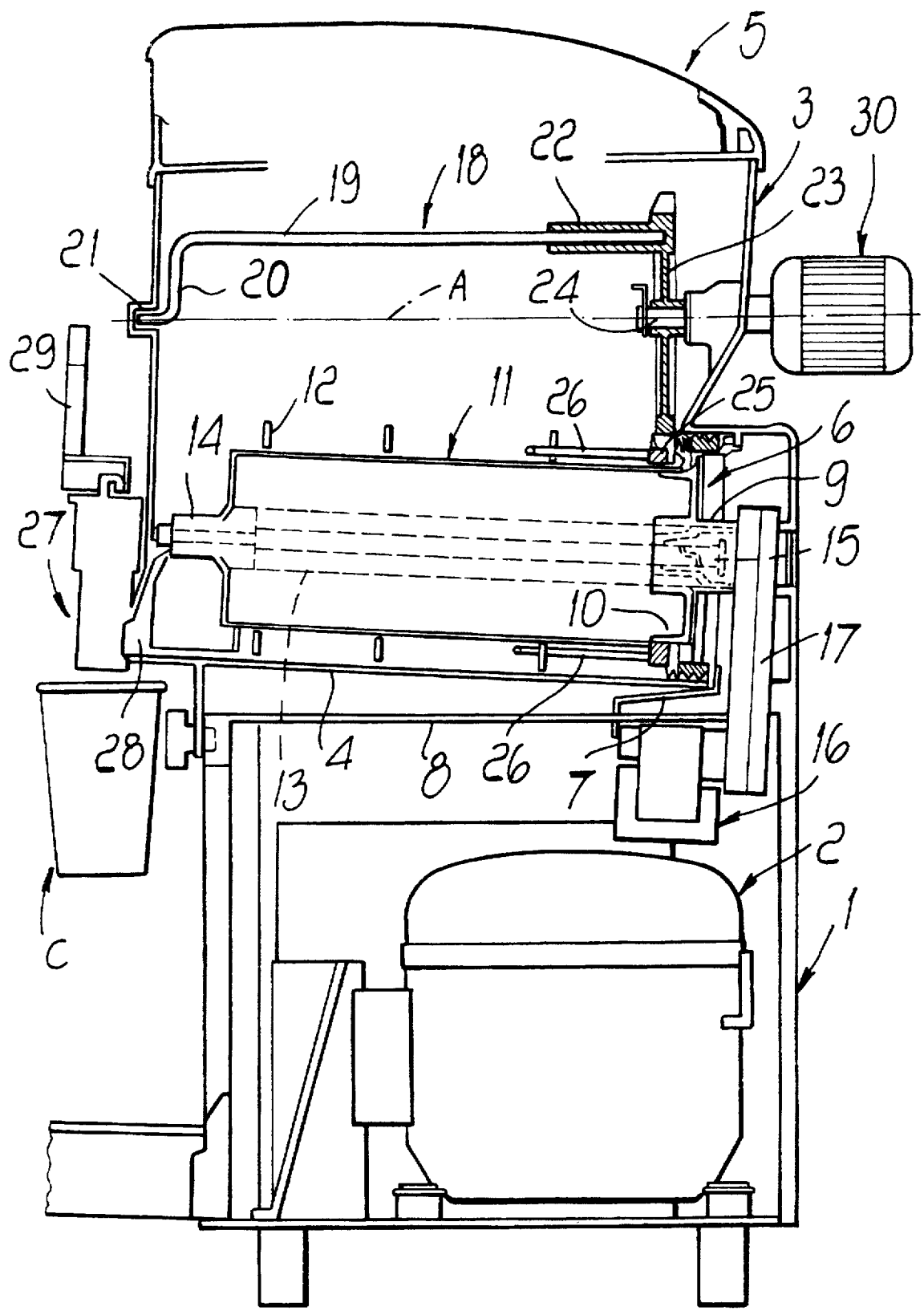

MACHINE FOR MAKING CRUSHED-ICE DRINKS

BACKGROUND OF THE INVENTION

The present invention relates to a machine for making crushed-ice drinks known as "slush".

Conventional machines for making crushed-ice drinks, also known as ice-crushers or blenders, currently comprise a tank for containing a watery mixture of the chosen flavor, which accommodates a substantially horizontal cylinder which is cooled from the inside by the evaporator of a refrigeration unit. A screw feeder is arranged concentrically outside said cylinder and is connected to motor means; by rotating, said screw feeder activates the heat exchange between the mix and the outer surface of the cylinder in order to form the typical ice granules.

Since the ice granules have a lower relative density than the liquid wherein they are immersed, they tend to float, thus forming lumps. Accordingly, an increasingly thick ice layer tends to form inside the tank on the surface of the liquid mix.

The part that remains liquid has of course a watery consistency.

The growth of the ice layer causes said layer to press, after an appropriate time, against the closure lid and break up. At this point, the ice particles mix in with the liquid part. Accordingly, conventional machines require three or four hours to obtain a crushed-ice drink. The resulting crushed-ice drink, however, does not always have the intended density throughout.

Another drawback arising from the formation of said ice layer inside the tank is constituted by the fact that said formation limits the potential of the machine, i.e., in practice, the volume of mix which can be processed.

SUMMARY OF THE INVENTION

A principal aim of the present invention is to solve the above-mentioned problem, by providing a machine which facilitates the production of crushed-ice drinks, avoiding in particular said ice layer inside the tank.

Within the scope of this aim, an object of the present invention is to provide a machine for making crushed-ice drinks which is simple in concept, safely reliable in operation, and highly efficient.

This aim, this object and others which will become apparent hereinafter are achieved, according to the present invention, by an improved machine for making crushed-ice drinks, comprising: a crushed-ice drink containment tank, which is provided at the front with a pouring tap adapted to control an outlet for said crushed-ice drink which is located proximate to a bottom of said tank; a hollow cylinder, which lies inside said tank and is cooled by a refrigeration unit; a screw feeder which is arranged concentrically outside said hollow cylinder and is connected to motor elements in order to activate, by rotating, the heat exchange between said crushed-ice drink and the outer surface of said cylinder; wherein said machine comprises a mixing element which is rotatably supported above said hollow cylinder, inside said tank, and is adapted to be rotated in order to maintain a uniform density of said crushed-ice drink.

BRIEF DESCRIPTION OF THE DRAWINGS

Further characteristics and advantages of the present invention will become apparent from the following detailed description of a preferred embodiment of the improved machine for making crushed-ice drinks, illustrated only by way of non-limitative example in the accompanying drawings, wherein the only FIGURE is a lateral sectional elevation view of a machine for making crushed-ice drinks according to the present invention, taken along a vertical plane.

DESCRIPTION OF THE PREFERRED EMBODIMENTS

With particular reference to said FIGURE, the machine for making crushed-ice drinks comprises a box-like footing 1 which is shaped substantially like a prism and wherein a refrigeration unit is accommodated, a compressor 2 whereof is shown in the drawing, the refrigeration unit having, in a manner known per se, an electric actuation motor with a fan, a condenser facing the motor fan, and a cylindrical evaporator.

At least one tank 3 for containing the crushed-ice drink is supported above the box-like footing 1. It is of course possible to provide any number of tanks according to the drink flavors to be produced.

The tank 3 is closed in a downward region by a semicylindrical bottom 4 and is closed in an upward region by a lid 5 which can be removed to access the inside of said tank, to introduce the ingredients of the crushed-ice drink, and for cleaning.

A shaped plate rises in a rear region from the footing and is composed of a flange 6 resting, with a rib 7, on an upper wall 8 of footing 1. The flange 6 has a central bush 9 and is provided with a cylindrical ridge 10 concentrically to said bush.

A hollow cylinder 11 is centered in the ridge 10 and is frontally fixed to the flange 6. An inner surface of the hollow cylinder 11 is in contact with said evaporator of the refrigeration unit, which covers it substantially completely. The axis of the cylinder 11 is conveniently inclined with respect to the horizontal plane, so that the free end of cylinder 11 is higher than the end fixed to the flange 6.

A screw feeder 12 is arranged outside the hollow cylinder 11 and is adapted to rotate in order to activate the heat exchange between the crushed-ice drink and the outer surface of cylinder 11. One end of the screw feeder 12 is keyed on a shaft 13 lying inside the hollow cylinder 11 coaxially thereto: the keying of the screw feeder 12 to the shaft 13 is provided by means of a cup-shaped element 14.

The opposite end of the shaft 13 is rotationally coupled to the output shaft 15 of an actuation unit comprising a gearmotor 16. The gearmotor 16 is supported by a housing 17 that contains adapted motion transmission means, is oscillatably mounted with respect to the bush 9, and is subjected to the elastic action of a spring, not shown.

During actuation, the gearmotor 16 is subjected, in a conventional manner, to a resisting moment which is proportional to the density of the crushed-ice drink contained in the tank 3. This resisting moment leads to an oscillation, by reaction, of the housing 17 about the axis of the shaft 13, the oscillation being counterbalanced by the spring. When the density of the crushed-ice drink exceeds a preset limit value, the oscillation causes the activation of a microswitch, not shown, which actuates valve means for cutting off the passage of the refrigerating fluid into the refrigeration unit.

Above the hollow cylinder 11, inside the tank 3, there is provided a mixing element 18 adapted to be rotated in order to maintain a uniform density of the crushed-ice drink. The mixing element 18 is constituted by a shaped bar 19 preferably made of steel rod and rotatably supported about a horizontal axis A which is parallel to the bar. The bar 19 forms, at one end, a neck 20 which is bent at right angles and is inserted in an adapted seat 21 formed in the front wall of the tank 3; at the opposite end, the bar 19 is inserted in a sleeve 22 which protrudes eccentrically from a toothed pulley 23.

It should be noted that the bar 19 axially engages only a front part of the sleeve 22. The full insertion of the bar 19 in the sleeve 22 allows to disengage the neck 20 of said bar from its seat 21 for the disassembly of said bar during ordinary cleaning and the like.

The pulley 23 is rotatably supported by a pivot 24 which protrudes inside the tank 3 along the axis A and meshes with a ring gear 25 mounted concentrically on the hollow cylinder 11. The ring gear 25 is coupled to the screw feeder 12 by means of a pair of stems 26 which fit in adapted holes of said screw feeder.

In order to control the dispensing of the crushed-ice drink contained in the tank 3, a tap 27 is provided which is fitted on the front wall of the tank, at an exit opening 28 aligned with the bottom 4. The tap 27 is actuated by an upper lever 29 for feeding the crushed-ice drink to the container C.

Operation of the machine for making crushed-ice drinks is easily understandable from the above description.

The rotation of the screw feeder 12, actuated in a conventional manner by the gearmotor 16, turns, by means of the stems 26, the gear system formed by the ring gear 25 and by the pulley 23. Accordingly, the bar 19 of the mixing element 18, being eccentrically rigidly coupled to the pulley 23, is in turn rotated about the axis A of said pulley.

The continuous rotation of the bar 19 has the purpose of keeping in motion the crushed-ice drink mixture which is forming, preventing the growth of an ice layer on the surface of the liquid mix. In addition to avoiding the drawbacks mentioned above of conventional machines, a crushed-ice drink is thus obtained the consistency whereof complies perfectly with the intended requirements.

It should be noted that, since the bar 19 is made of steel rod, it does not produce impact actions inside the mass of the crushed-ice drink being formed and therefore the intended consistency of the drink is not modified.

The described invention perfectly achieves the intended aim and objects. In particular, thanks to the mixing element, which prevents the formation of an ice layer, it is possible to obtain a crushed-ice drink of uniform density in a relatively short time.

It should be noted that the mixing element is advantageously actuated by the motor elements provided for the actuation of the screw feeder. However, it is obviously possible to actuate said mixing element through independent motor elements, as shown by way of example by the dashed line 30 in the drawing.

Another substantial advantage of the invention resides in the fact that it is possible to obtain the maximum potential from the machine, processing a volume of mix which is substantially larger than that of conventional machines.

In the practical embodiment of the invention, the materials used, as well as the shapes and the dimensions may be any according to requirements.

What is claimed is:

1. A machine for making crushed-ice drinks, comprising: a crushed-ice drink containment tank; a pouring tap disposed on a front wall of the containment tank near a bottom wall thereof and adapted to control an outlet for crushed-ice drink in the containment tank; a hollow cylinder disposed inside said containment tank and adapted to be cooled by a refrigeration unit for transferring heat from a crushed-ice drink within the containment tank; a screw feeder arranged within said containment tank concentrically outside said hollow cylinder for rotation about said hollow cylinder in response to motor elements coupled thereto to promote heat exchange between crushed-ice drink in the containment tank and the outer surface of said hollow cylinder; and a mixing element rotatably supported above said hollow cylinder, inside said containment tank, and adapted to be rotated in order to maintain a uniform density of crushed-ice drink within the containment tank.

2. A machine according to claim 1, wherein said mixing element comprises a bar which is rotatably supported eccentric a horizontal axis which is parallel to said bar.

3. A machine according to claim 2, wherein said bar is a steel rod.

4. A machine according to claim 1, wherein said mixing element comprises a bar which is eccentrically rigidly coupled to a pulley which is rotatably supported by a pivot protruding inside said containment tank along a horizontal axis which is parallel to said bar; said pulley being adapted to be rotated by actuation means coupled thereto.

5. A machine according to claim 4, wherein said pulley includes a sleeve formed eccentrically thereon along an axis which is parallel to the rotation axis of said pulley; and an end of said bar is inserted in said sleeve for eccentric rotation therewith.

6. A machine according to claim 1, wherein said mixing element includes a bar which is eccentrically rigidly coupled to a pulley which is rotatably supported about a horizontal axis which is parallel to said bar; said pully includes a gear which meshes with a ring gear concentrically mounted for rotation about said hollow cylinder by said screw feeder.

7. A machine according to claim 6, wherein said ring gear is coupled to said screw feeder by a pair of stems attached to said screw feeder.

\* \* \* \* \*